United States Patent
Yockey et al.

[11] Patent Number: 5,329,199
[45] Date of Patent: Jul. 12, 1994

[54] ROTOR ASSEMBLY WITH MOLDED FANS AND METHOD FOR MAKING THE SAME

[75] Inventors: Steven J. Yockey, Farmington Hills; Gregory A. Ritchie, Ypsilanti; Joseph E. Saval, Romulus; Eric D. Bramson, Ann Arbor, all of Mich.

[73] Assignee: Ford Motor Company, Dearborn, Mich.

[21] Appl. No.: 980,048

[22] Filed: Nov. 23, 1992

[51] Int. Cl.⁵ .................. H02K 1/22; H02K 15/02; H02K 1/04
[52] U.S. Cl. ........................ 310/263; 310/42; 310/43
[58] Field of Search .............. 310/42, 43, 62, 63, 310/261, 263, 194; 29/598

[56] References Cited

U.S. PATENT DOCUMENTS

| | | | |
|---|---|---|---|
| 3,230,404 | 1/1966 | Graham | 310/51 |
| 4,031,601 | 6/1977 | Staub et al. | 29/156.88 |
| 4,390,804 | 6/1983 | Orova et al. | 310/70 R |
| 4,588,911 | 5/1986 | Gold | 310/43 |
| 4,588,915 | 5/1986 | Gold | 310/43 |
| 4,618,793 | 10/1986 | Shizuka et al. | 310/232 |
| 4,980,592 | 12/1990 | Olmr et al. | 310/263 |
| 5,015,901 | 5/1991 | Phelon et al. | 310/43 |
| 5,053,657 | 10/1991 | Ikegami et al. | 310/63 |
| 5,118,978 | 6/1992 | Matsumoto et al. | 310/43 |
| 5,121,020 | 6/1992 | Bertram et al. | 310/43 |

FOREIGN PATENT DOCUMENTS

| | | | |
|---|---|---|---|
| 2609583 | 7/1988 | France | 310/263 |
| 0131051 | 7/1985 | Japan | 310/261 |
| 0189928 | 8/1987 | Japan | 310/261 |
| 0170352 | 7/1989 | Japan | 29/598 |

*Primary Examiner*—Steven L. Stephan
*Assistant Examiner*—C. LaBalle
*Attorney, Agent, or Firm*—Roger L. May; Paul K. Godwin, Jr.

[57] ABSTRACT

A molded rotor assembly (20) including at least one molded fan (28), a method for making the same, and a vehicle alternator (160) using the molded rotor assembly (20) are disclosed. The rotor assembly (20) includes first and second pole pieces (24,26) aligned along a longitudinal axis (40) defining a region (122) between the pole pieces (24,26). Each pole piece (24,26) has an outboard axial face (69,71). At least one molded fan (28) is integrally molded to one of the axial outboard faces (69) of a pole piece (24). Preferably, a molded insert (22) is molded in the region (122) between the pole pieces (24,26) and is integral with the molded fan (28) to secure the molded fan (28) to the pole piece (24). Alternatively, anchoring recesses (241,245) are formed in an outboard face of a pole piece (224) with a molded fan (228) having anchoring portions (249,251) secured within the recesses (241,245) to retain the fan (228) to the outboard axial face.

17 Claims, 7 Drawing Sheets fig-1 fig-2 fig-3 fig-5 fig-6 fig-7 fig-8 fig-9 fig-10 fig-12 fig-11 fig-13 fig-14

ROTOR ASSEMBLY WITH MOLDED FANS AND METHOD FOR MAKING THE SAME

TECHNICAL FIELD

This invention relates generally to vehicle alternators, and more particularly, to rotor assemblies having fans.

INCORPORATION BY REFERENCE

The disclosures contained in patent applications entitled, "Molded Rotor Assembly For An Alternator And Method For Making The Same", U.S. Ser. No. 980,391, and "Automotive Alternator Slip Ring Assembly", U.S. Ser. No. 980,393, which are commonly owned by the Assignee of this application and which are simultaneously filed with this application, are hereby incorporated by reference.

BACKGROUND ART

A rotor assembly for a vehicle alternator generally comprises the following: a rotor shaft, a slip ring assembly, a pair of pole pieces which conduct magnetic flux, a coil wire held between the pole pieces, and a pair of stamped steel cooling fans welded to respective outboard faces of the pole pieces. The rotation of the cooling fans creates air circulation through the alternator to cool the alternator. However, use of these stamped steel cooling fans has several shortcomings.

First, the number and size of blades formed in the stamping operation are limited by the finite amount of sheet steel which is stamped to form the fan. This finite amount or volume leads to a trade off between blade height, length and total number of blades. Accordingly, the total surface area of blades on a stamped metal fan is restricted.

Second, configurations of blade geometries on stamped steel fan blades are limited. The blade geometries must be compatible with matching dies forming the blades. Therefore, stamped blade configurations are limited as compared to those attainable through other modes of construction.

Third, edges of stamped fan blades are usually sharp and somewhat rough due to the shearing operation used to cut the fans from the metal sheet. The sharp and rough edges disturb the airflow in an alternator as air passes by the blade edges. Further, the jagged edges may cause cuts and scrapes on workers handling the stamped fans.

Fourth, another concern in high-speed alternator design is the amount of imbalance existing in a rotor assembly. When stamped metal fans are welded to pole pieces, the fans typically introduce a significant amount of imbalance to the rotor assembly. The greater the imbalance, the greater the work required to bring the rotor assembly into balance. Also, many rotor assemblies use varnish to hold components of the rotor assembly in place. This may add to the imbalance of the rotor assembly.

Finally, using stamped metal fans with a rotor assembly adds several operations to the construction of the rotor assembly. The fans must first be stamped from sheet steel. Second, the fans must be mounted and welded to the pole pieces. Third, imbalances associated with the addition of the stamped metal fans must be corrected through an iterative balancing operation.

The present invention addresses problems associated with the above-identified shortcomings.

DISCLOSURE OF INVENTION

The present invention includes a molded rotor assembly for a vehicle alternator. The rotor assembly comprises an elongated rotor shaft having a longitudinal axis and first and second pole pieces axially aligned along and spacedly mounted on the rotor shaft to define a region between the pole pieces. Each pole piece has an outboard axial face. A coil wire is cooperatively held in the region between the pole pieces and has a pair of free ends. A pair of slip rings are mounted on the rotor shaft and are connected to a pair of terminals, each terminal attaching to a respective free end of the coil wire to form a respective connection. At least one molded fan is integrally molded to one of the outboard axial faces and has a plurality of circumaxially spaced blades.

Preferably, the rotor assembly also has a molded insert integrally molded to at least one of the pole pieces in the region between the pole pieces and is integral with the fan to anchor the fan to the pole piece.

Each pole piece is preferably annular and has along its radial periphery a plurality of circumaxially spaced and axially inboard-extending fingers, the fingers on each pole piece interleaving with the fingers on the other pole piece. If a molded insert is present between the pole pieces, ideally the molded insert provides radial support to the fingers and encapsulates the coil wire and the connections.

As an alternative to using the molded insert, anchoring recesses can be formed into the outboard face of the pole piece. The molded fan then includes anchoring portions which are molded into the anchoring recesses to secure the molded fan to the outboard face. The anchoring recesses may be dovetailed in cross-section or else any other suitable cross-section which provides for anchoring of anchoring portions of the fan.

As the fan is molded, the blades of the fan may have any shape which is compatible with molding including any number of blades and any desired amount of surface area. Also, the molded fan can be accurately secured to the pole piece thereby providing a molded rotor assembly which is relatively well-balanced and which requires minimal alterations to achieve a balanced condition.

Further, the present invention encompasses a method of making a molded rotor assembly with molded fans thereon. The method comprises the following steps.

A pair of pole pieces are mounted on an elongated rotor shaft with a coil wire, having a pair of free ends, being held in a region formed between the pole pieces. Each pole piece has an outboard axial face. A pair of slip rings, connected to a pair of terminals, are mounted on the rotor shaft. The free ends of the terminals are connected to respective free ends of the coil wire to form a pair of connections. Finally, at least one fan is molded to one of the outboard axial faces of one of the pole pieces.

Preferably, the step of molding includes molding a molded insert into the region formed between the pole pieces, the molded insert acting as an anchor to retain the molded fan to the pole piece.

However, if no molded insert is provided, then at least one of the outboard axially faces may have anchoring recesses formed therein and the step of molding includes molding anchoring portions into the anchoring recesses securing the fan to the axial outboard face.

It is an object of the present invention to provide a rotor assembly having both an integrally molded insert between pole pieces and integrally molded fans, the insert and the fans being formed in a single molding operation thereby eliminating manufacturing steps typically associated with constructing rotor assemblies with stamped metal fans.

It is another object to provide a rotor assembly having integrally molded fans with blades that have smooth edges.

An additional object is to provide a rotor assembly having molded fans which are accurately molded on pole pieces to closer tolerances than are typically found with rotor assemblies using stamped metal fans thereby minimizing imbalances which must be corrected during a balancing operation.

It is yet a further object to provide a rotor assembly having integrally molded fans which may be molded into complex geometric configurations and which are not limited in surface area or in the number blades they may contain.

Other objects, features and advantages will become more readily apparent from the following description and accompanying sheets of drawings.

BEST MODE FOR CARRYING OUT THE INVENTION

Figures 1, 2, 3:
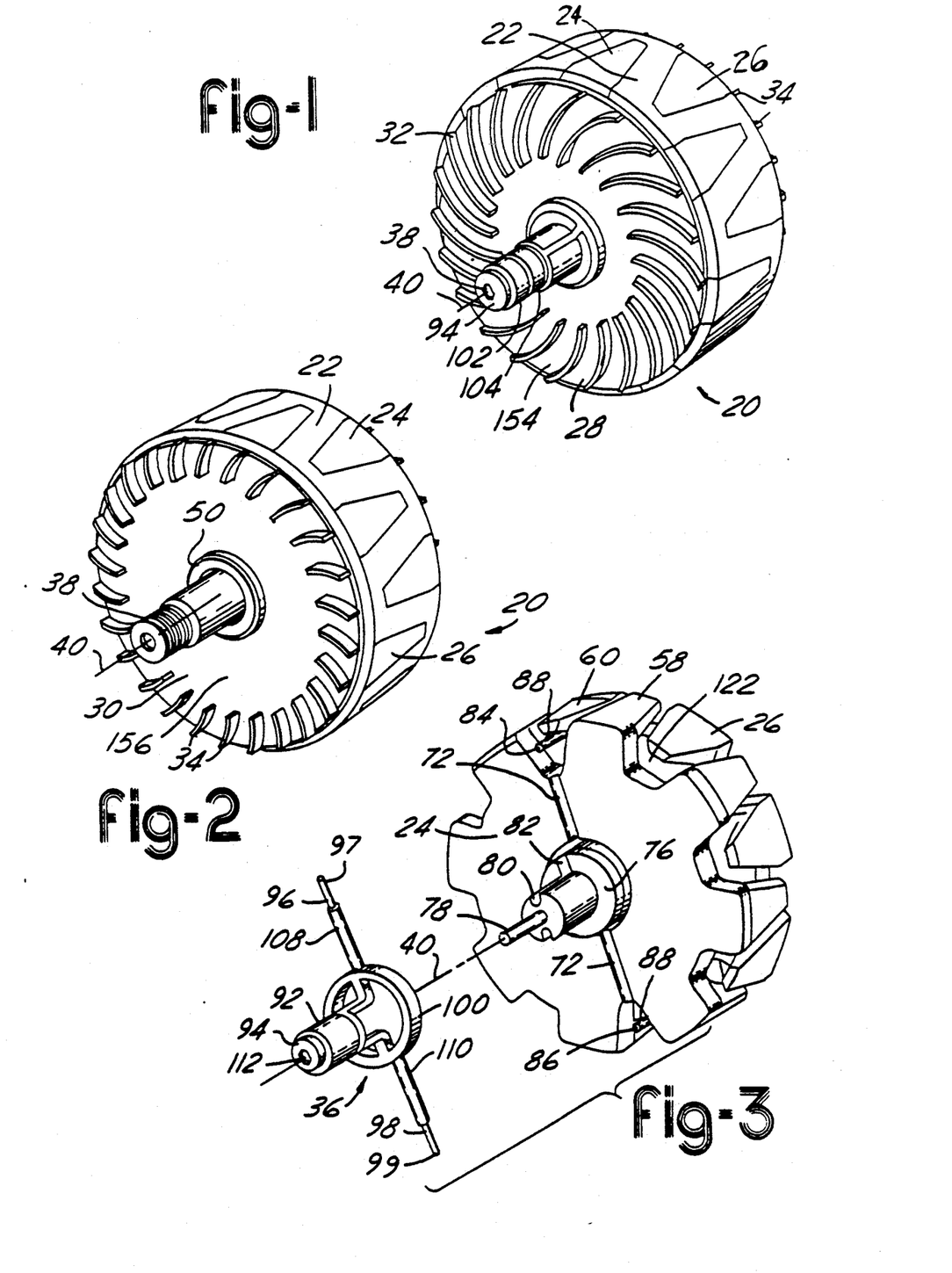
FIG. 1 is a rear perspective view of a molded rotor assembly, including molded fans and a slip ring assembly, made in accordance with the present invention.
FIG. 2 is a front perspective view of the rotor assembly of FIG. 1.
FIG. 3 is an exploded view of a slip ring assembly, pole pieces and a rotor shaft.

With reference to the drawings, a molded rotor assembly made in accordance with a preferred first embodiment is generally indicated by the reference numeral 20. As seen in FIGS. 1 and 2, rotor assembly 20 includes a molded insert 22 sandwiched between first and second pole pieces 24 and 26. First and second molded fans 28 and 30 have a plurality of circumaxially spaced blades 32 and 34, respectively, which are integrally molded to first and second pole pieces 24 and 26. Prior to any molding, a slip ring assembly 36, depicted in FIG. 3, as well as first and second pole pieces 24 and 26, are mounted to a rotor shaft 38 which is axially aligned along a longitudinal axis 40 of rotor shaft 38.

Figure 4:
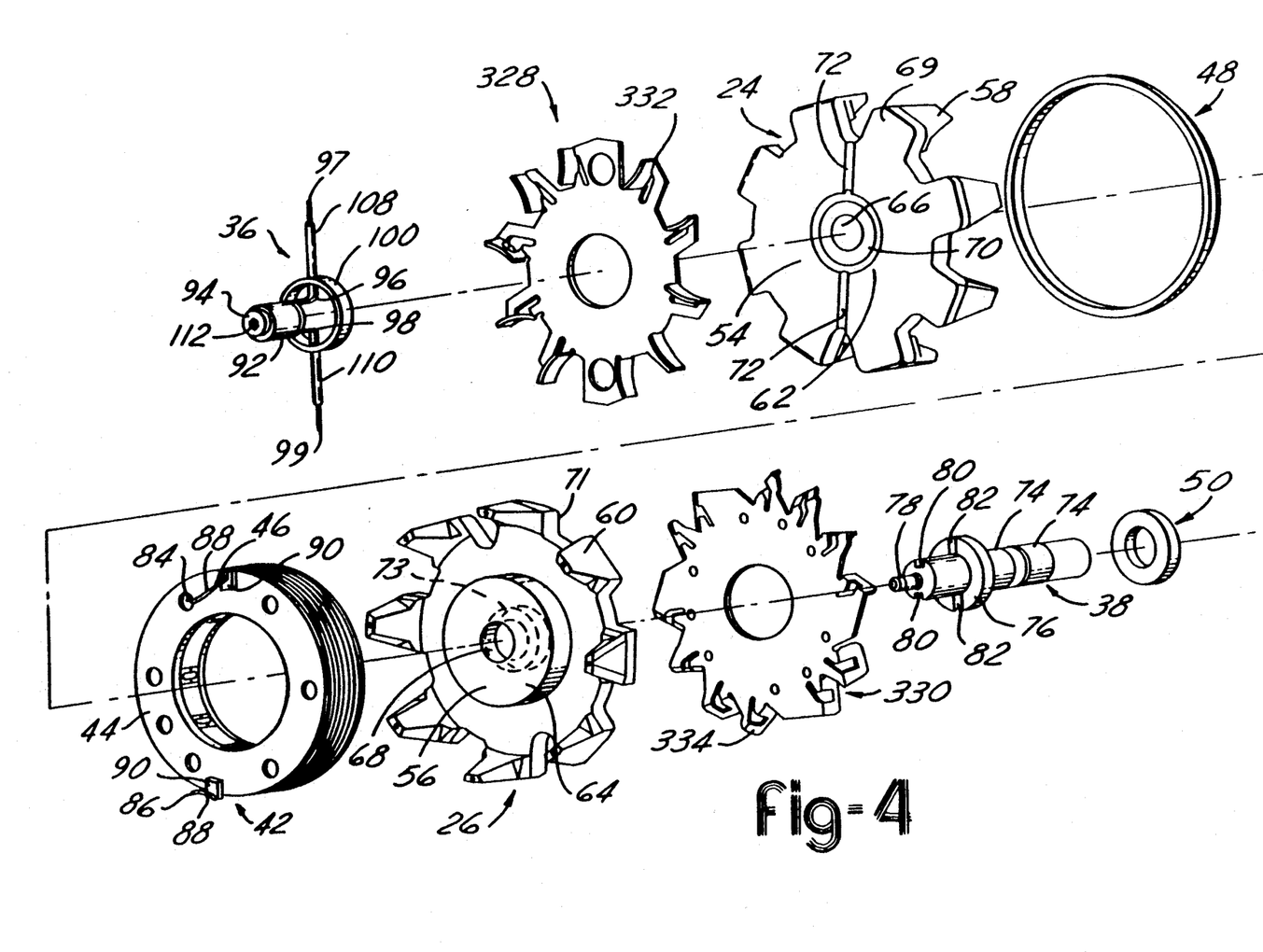
FIG. 4 is an exploded view of components included in a rotor assembly which uses stamped metal fans rather than molded fans.

FIG. 4 is an exploded view of components included in the rotor assembly 20. Stamped metal fans 328 and 330, used in place of molded fans 28 and 30 in an alternative embodiment of a rotor assembly, are also shown. The rotor assembly 20 comprises first and second pole pieces 24 and 26, slip ring assembly 36, rotor shaft 38, a bobbin assembly 42 including a bobbin 44 which holds a coil wire 46, and a nonmagnetic annular support ring 48. Also shown is a collar 50 which mounts on rotor shaft 38 outboard of pole piece 26.

First and second pole pieces 24 and 26 have respective central annular portions 54 and 56 and a plurality of circumaxially spaced and axially inboard-extending fingers 58 and 60 disposed along their respective radial peripheries. The annular portions 54 and 56 have hubs 62 and 64 with respective bores 66 and 68 therein. On the back or outboard axial face 69 of pole piece 24 are annular recess 70 and a pair of radially extending channels 72 which are sized and configured to receive, in a flush manner, portions of slip ring assembly 36. Pole piece 26 has a front outboard face 71 with an annular recess 73 formed therein which is adapted to receive collar 50. Pole pieces 24 and 26 are preferably made of steel.

Rotor shaft 38, also preferably made of steel, has splined portion 74 onto which bores 66 and 68 of pole pieces 24 and 26 are press fit. An integral collar 76 is formed on rotor shaft 38 to provide a stop against which the slip ring assembly 36 may snugly fit. Rotor shaft 38 also has a reduced diameter end 78. Pairs of respective axial grooves 80 and radial grooves 82 are formed in rotor shaft 38, with radial grooves 82 located within collar 76.

Bobbin assembly 42 includes annular bobbin 44 which is U-shaped in cross-section and is designed to hold turns of coil wire 46. Coil wire 46 is wound about bobbin 44 and has free ends 84 and 86. The turns of coil wire 46 are electrically insulated from one another by insulating coating 88 which is applied to the outside of the coil wire 46 prior to winding coil wire 46 on to bobbin 44. In the preferred embodiment, this insulating coating is armored polythermaleze 2000 (APTZ) which is available, along with coil wire 46, from Phelps Dodge Magnet Wire Company of Fort Wayne, Ind.

Bobbin 44 preferably is made from a molded plastic and serves to assist in electrically insulating coil wire 46 from pole pieces 24 and 26. Along the radial periphery of bobbin 44 are a pair of forked guides 90 which retain free ends 84 and 86 of coil wire 46 as they leave bobbin 44.

Figures 5, 6, 7, 8:
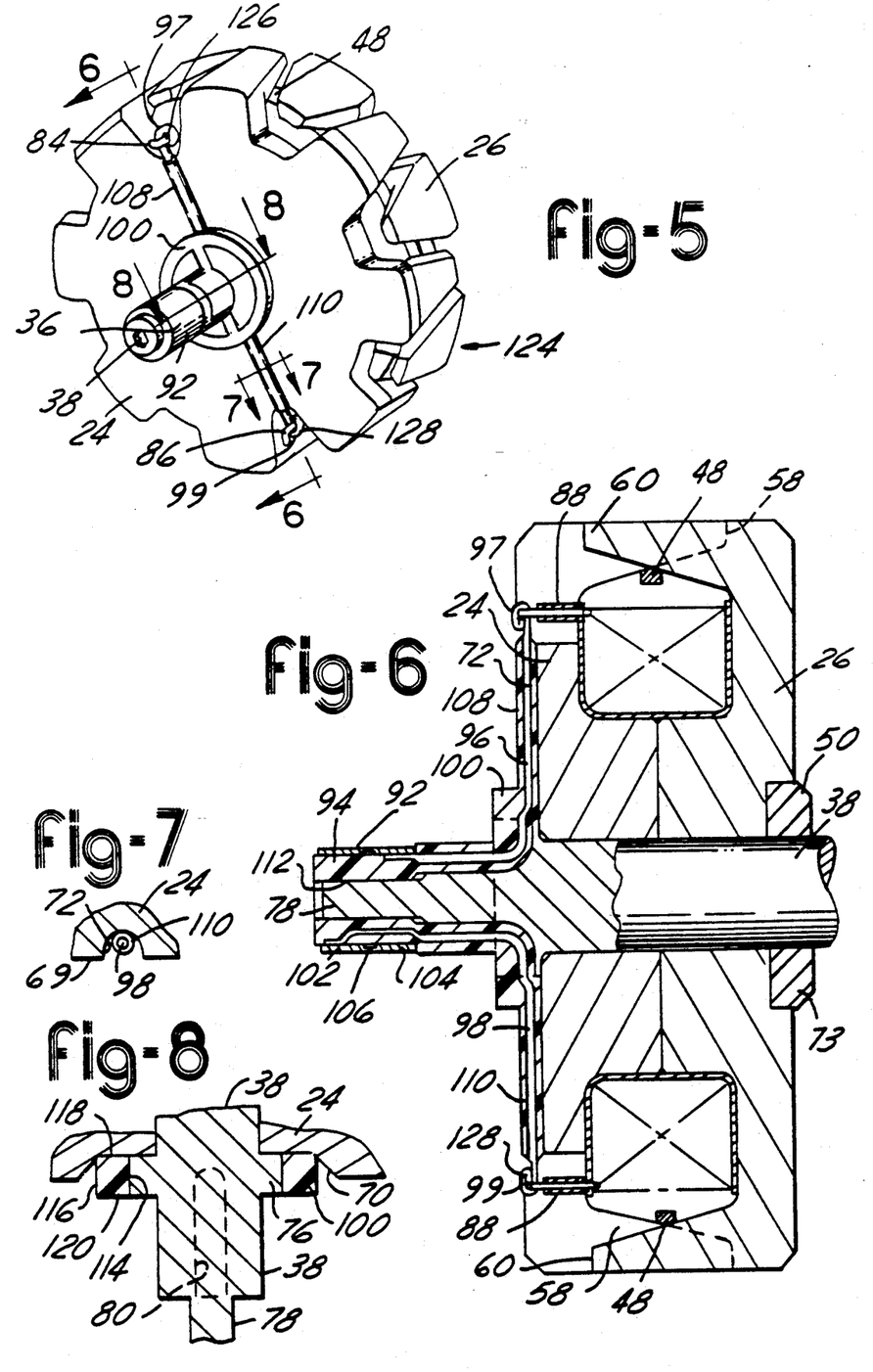
FIG. 5 is a rear perspective view of a rotor subassembly showing connections formed between terminals of the slip ring assembly and free ends of a coil wire.
FIG. 6 is sectional view taken along line 6—6 of FIG. 5.
FIG. 7 is a fragmentary sectional view taken along line 7—7 of FIG. 5.
FIG. 8 is a fragmentary sectional view taken along line 8—8 of FIG. 5.

Slip ring assembly 36 comprises an annular metallic band 92, a hub 94, a pair of L-shaped terminals 96 and 98 and a circular mold shutoff ring 100. FIG. 6 shows a cross-sectional view of slip ring assembly 36 mounting on rotor shaft 38 and against pole piece 24. Metallic band 92 is preferably copper and has a pair of axially spaced slip rings 102 and 104 connected together by a reduced thickness bridge portion 106. After slip ring assembly 36 has been mounted on rotor shaft 38, the outer radial portion of band 92 is machined away to remove bridge portion 106 and thereby separate slip rings 102 and 104 from one another, as seen in FIG. 1.

Terminals 96 and 98 are metallic, preferably copper, and are surrounded by insulating coverings 108 and 110, except at respective exposed ends 97 and 99. Hub 94 has a bore 112 therein adapted to fit over reduced diameter end 78 of rotor shaft 38 in a press-fit manner. Hub 94 serves to support and insulate slip rings 102 and 104 from each other and from rotor shaft 38.

Mold shutoff ring 100 supports and provides structural rigidity to terminals 96 and 98. Terminals 96 and 98 pass through the axial length of mold shutoff ring 100. As best seen in FIG. 8, mold shutoff ring 100 has an inner radial surface 114, an outer radial surface 116, and planar inboard and outboard axial surfaces 118 and 120. Inboard axial surface 118 mates flushly against annular recess 70 in outboard face 69 of pole piece 24 as does collar 76 of rotor shaft 38. Inner radial surface 114 is flushly mounted over the outer diameter of collar 76 of shaft 38.

Slip ring assembly 36 is constructed by soldering or welding first ends of terminals 96 and 98 to respective slip rings 104 and 102, as seen in FIG. 6. Terminal 98 is configured to bypass slip ring 104. Terminals 96 and 98 and slip rings 102 and 104 are then placed within an appropriately configured mold. The mold is filled with a molten plastic material to form hub 94, mold shutoff ring 100 and insulating coverings 108 and 110 of slip ring assembly 36. The preferred plastic material to be used in the construction of slip ring assembly 36 is a glass-filled polyphenylene sulfide sold under the trade name Ryton ® by the Phillips 66 Company. Those skilled in the art will realize that alternative materials may also be used to mold slip ring assembly 36.

Annular or circular support ring 48 has an outer diametrical periphery which is slightly larger than the inner diameters of interleaved first and second fingers 58 and 60 of respective pole pieces 24 and 26. Support ring 48 is made of a nonmagnetic material such as aluminum. The support provided to fingers 58 and 60 by the support ring 48 reduces vibration during rotation of rotor assembly 20.

Looking back now to the exploded view of FIG. 3, pole pieces 24 and 26 are mounted upon rotor shaft 38 and are axially aligned along longitudinal axis 40. Fingers 58 and 60 of pole pieces 24 and 26 are interleaved and spaced apart with respect to one another. A region 122 is defined between pole pieces 24 and 26. Free ends 84 and 86 of coil wire 46 are shown extending axially outboard from region 122.

Slip ring assembly 36 is also mounted on rotor shaft 38. Bore 112 of slip ring assembly 36 fits over reduced diameter end 78 in a press-fit manner. Axially extending portions of terminals 96 and 98 are received in axial grooves 80 of rotor shaft 38. Likewise, radially outward extending portions of terminals 96 and 98, located radially within mold shutoff ring 100, are received in radial grooves 82 of collar 76. The portions of terminals 96 and 98 and of the portions of coverings 108 and 110 located radially outside mold shutoff ring 100 are received within radially extending channels 72 located in outboard face 69 of pole piece 24. Radially extending recesses 72 are deep enough to receive terminals 96 and 98 and their coverings 108 and 110 beneath the planar surface of axial outboard face 69 of pole piece 24, as shown in FIG. 7.

Referring again to FIG. 8, inboard axial surface 118 of mold shutoff ring 100 is nested flush within annular recess 70 of pole piece 24. Likewise, collar 76 of rotor shaft 38 also rests flush in annular recess 70. Inner radial surface 114 of mold shutoff ring 100 fits snugly over and receives radial support from the cylindrical surface of collar 76.

FIG. 5 shows a subassembly 124 including pole pieces 24 and 26, slip ring assembly 36, rotor shaft 38, and support ring 48 after these components have been assembled together. A pair of connections 126 and 128 are formed between respective free ends 84 and 86 of coil wire 46 and exposed ends 97 and 99 of terminals 96 and 98.

To form connections 126 and 128, exposed ends 97 and 99 of terminals 96 and 98 are first bent into a hook shape. Free ends 84 and 86 are then placed within the exposed ends 97 and 99 and an apparatus, not shown, crimps and heats ends 84 and 86 and exposed ends 97 and 99. In this operation, insulating coating 88 on each of ends 84 and 86 is melted away leaving respective welded connections 126 and 128 which are electrically connected, as shown in FIG. 6.

Figures 9, 10:
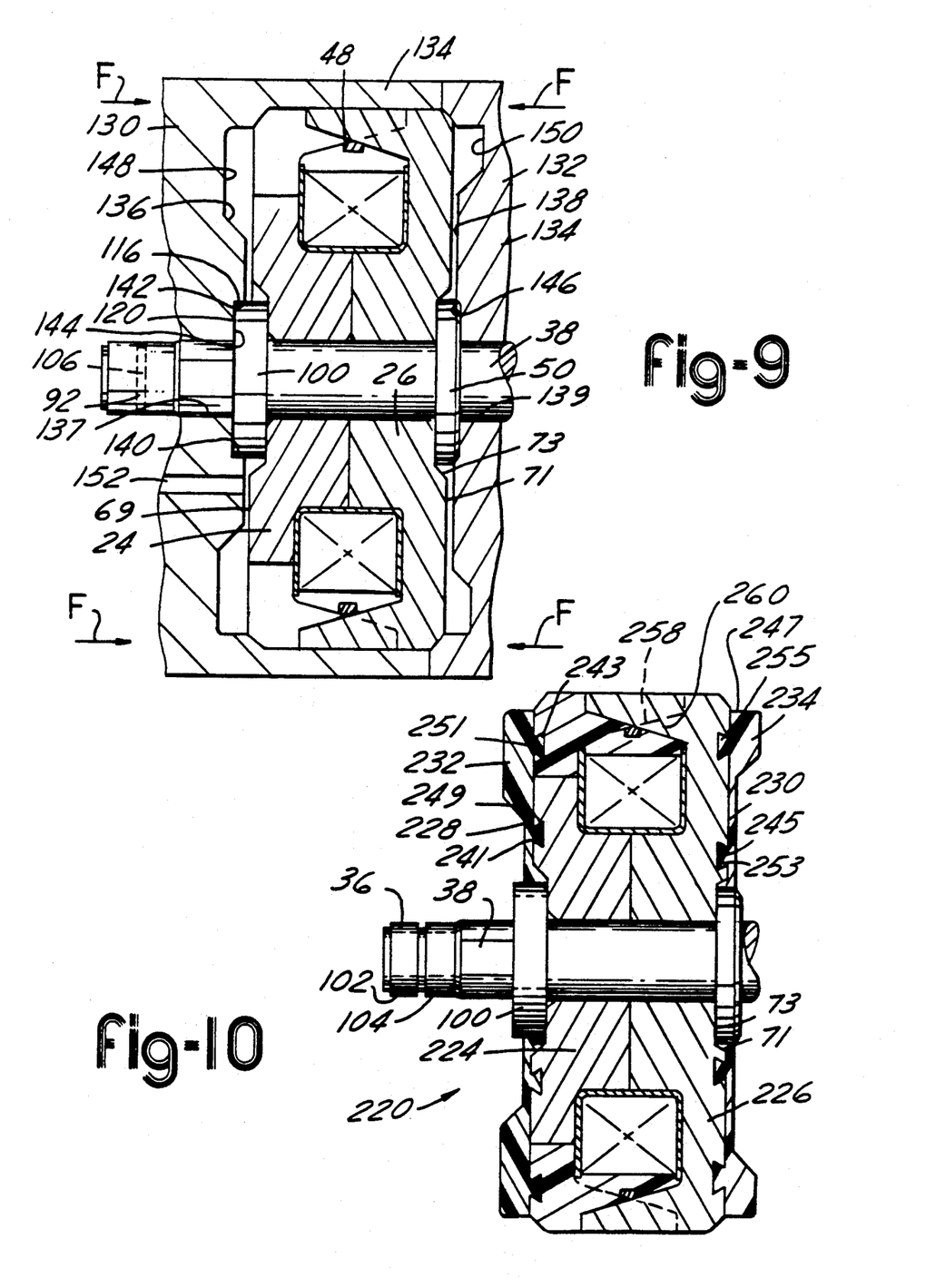
FIG. 9 is a partial sectional view of the rotor subassembly of FIG. 5 located within a mold.
FIG. 10 is a sectional view of an alternative embodiment of a molded rotor assembly with molded fans but absent the molded insert.

Turning now to FIG. 9, rotor subassembly 124 is placed between a pair of mold halves 130 and 132 of a mold 134. Mold halves 130 and 132 have respective inner surfaces 136 and 138 which mate against mold shutoff ring 100 and collar 50 and the outer radial periphery of pole pieces 24 and 26. Inner surface 136 has a cup-shaped recess 140 including a radial mating surface 142 and an outboard mating surface 144 which mate, respectively, with outer radial surface 116 and outboard surface 120 of mold shutoff ring 100. The mating of mold shutoff ring 100 between recess 70 on pole piece 24 and recess 140 of mold half 130 serves as a mold shutoff to prevent mold material from flowing onto rotor shaft 38 and band 92 during molding. Similarly, a cup-shaped annular recess 146 mates against the outboard and outer radial surfaces of collar 50 to provide a mold shutoff to prevent mold material from reaching rotor shaft 38 adjacent pole piece 26.

Rotor apertures 137 and 139 are formed in respective inner surfaces 136 and 138 of mold 134 to accommodate rotor shaft 38. Sprue 152 is provided in mold half 130 to introduce mold material into mold 134. Blade recesses 148 and 150 are also contoured into respective inner surfaces 136 and 138 to form blades 32 and 34 of molded fans 28 and 30 during molding.

In operation, mold halves 130 and 132 are pressed against pole pieces 24 and 26 of rotor subassembly 124. Recesses 140 and 146 mate against mold shutoff ring 100 and collar 50 to prevent mold material from reaching rotor shaft 38 and band 92 during the molding operation. As mold shutoff ring 100 is radially supported by collar 76 on rotor shaft 38 and axially supported against recess 70, large compressive forces can be applied across mold half 130, mold shutoff ring 100 and pole piece 24 to ensure proper mold shutoff without damaging mold shutoff ring 100. Similarly, a counterbalancing compressive force can be applied across mold half 132, collar 50 and pole piece 26. As mold material is injected at high temperatures and under high pressure, a large rather than small compressive load holding mold 134 about rotor assembly 124 is preferred.

Prior to molding, subassembly 124 is preheated. The mold material forming molded fans 28 and 30 and molded insert 122 is Ryton ™, the same material as is used to make slip ring assembly 36. The mold material is heated to a molten state of approximately 316° C.

Mold material is then injection molded at high pressures through sprue 152 into the open spaces between mold 134 and pole pieces 24 and 26 to form molded rotor assembly 20. The mold material travels radially outwardly forming fan 28 having blades 32. The mold material then passes through the circumaxially spaced gaps in outboard face 69 formed between fingers 58 and fills region 122 located between pole pieces 24 and 26 to form molded insert 22. Finally the mold material passes through circumaxially spaced gaps in outboard face 71 between fingers 60, to form fan 30 having blades 34.

The molten mold material cools and solidifies before melting either coverings 108 and 110 or mold shutoff ring 100 of slip ring assembly 36. The armored polythermaleze 2000 coating 88 on coil wire 40 has a flow temperature of between 325°-350° C. Therefore, no flow or disruption of coating 88 on coil wire 46 occurs during molding. Consequently, coil wire 46 and terminals 96 and 98 remain electrically insulated from pole pieces 24 and 26 after the molding operation has been completed.

The resulting molded rotor assembly 20 is shown in FIGS. 1 and 2. The outboard axial faces 69 and 71 of pole pieces 24 and 26 include thin coverings 154 and 156 of molded material. Coverings 154 and 156 and the blades 32 and 34 combine to form fans 28 and 30. Connections 126 and 128, as well as support ring 48 and bobbin assembly 42, are encapsulated by molded insert 22. Molded insert 22 fills region 122 between pole pieces 24 and 26 and is integral to fans 32 and 34, thereby retaining fans 32 and 34 to pole pieces 24 and 26.

The radially outer periphery of molded rotor 20, if not sufficiently smooth, is then machined. This produces a smooth cylindrical periphery with radially outer surfaces on the fingers 58 and 60 being exposed. Band 92 of slip ring assembly 36 is machined to produce a clean conductive surface and to electrically separate slip rings 102 and 104 from one another.

The smooth outer cylindrical periphery of molded rotor assembly 20 produces less air disturbance than a similar rotor without a smooth periphery. Also, less noise is generated by vibrating fingers 58 and 60 on pole pieces 24 and 26, which are supported by molded insert 22, as compared to a rotor assembly wherein the fingers are not supported.

Rotor assembly 20 is then balanced. Appropriate portions of material are removed from pole pieces 24 and 26 in a standard balancing procedure. With molded insert 22 and molded fans 32 and 34 being accurately molded to pole pieces 24 and 26, rotor assembly 20 has been found to be better balanced and require less rework to achieve a balance condition than a corresponding rotor assembly which has metal fans welded to pole pieces.

Figure 14:
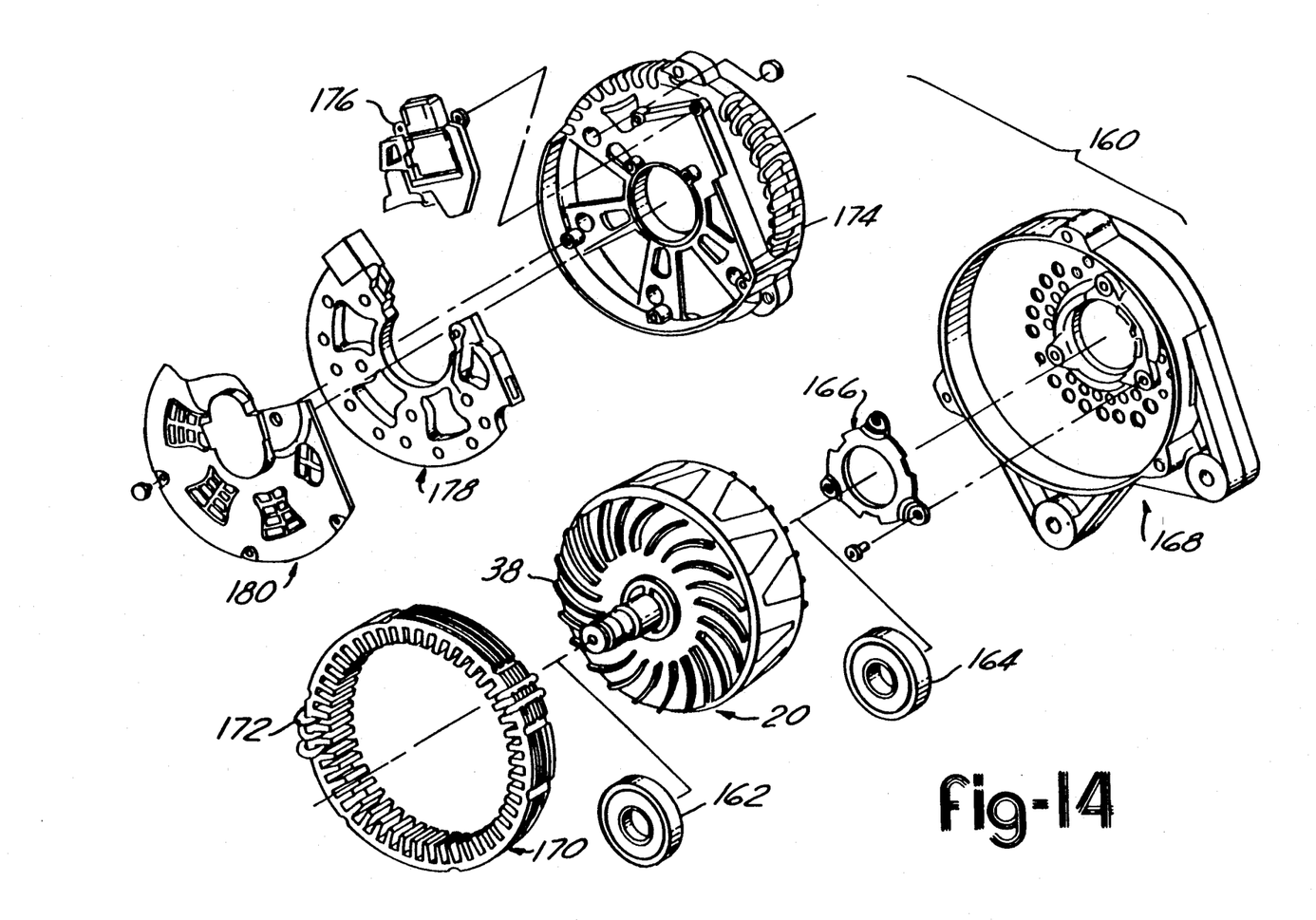
FIG. 14 is an exploded perspective view of an alternator incorporating the improved molded rotor assembly.

FIG. 14 demonstrates how rotor assembly 20 is combined with other components to form a vehicle alternator 160. Bearings 162 and 164 are mounted on either side of molded rotor assembly 20 on rotor shaft 38. Bearing 164 is supported by a retainer 166 which is bolted to a front housing piece 168. A stator 170 with windings 172, is placed radially about rotor assembly 20. A back housing piece 174 is joined to front housing piece 168 to support stator 170 and bearings 162 and 164. A brush holder and regulator 176, rectifier 178 and cover 180 are also included in vehicle alternator 160.

Method steps used in constructing rotor assembly 20 are as follows. First, coil wire 46, having coating 88 thereon, is wound about bobbin 44 to form the bobbin assembly 42. First and second pole pieces 24 and 26 are then placed together on rotor shaft 38 capturing the bobbin assembly 44 in the region 122. Hubs 46 and 48 are placed to abut one another such that the axially extending fingers 58 and 60 are interleaved and spaced apart relative to one another. Slip ring assembly 36 is then press fit onto rotor shaft 38 with mold shutoff ring 100 being flush against recess 70 of pole piece 24 and rotor shaft 38. Connections 126 and 128 are made between each of free ends 84 and 86 of coil wire 46 and the respective exposed ends 97 and 99 of terminals 96 and 98 of slip ring assembly 36. Finally, rotor subassembly 124 is compressively held in place between mold halves 130 and 132 of a mold assembly 134 with mold shutoff ring 100 sealing rotor shaft 38 and slip rings 102 and 104 from mold 134.

Mold material is then injection molded into the mold 134 forming molded insert 22 which is molded integrally to pole pieces 24 and 26 and fills region 122 between pole pieces 24 and 26. Also, fans 28 and 30 are formed. Molded insert 22 partially encapsulates fingers 58 and 60 thereby providing radial support to fingers 58 and 60. Further, a smooth cylindrical surface on the rotor assembly 20 is formed. Optionally, the method includes placing a support ring 48 within fingers 58 and 60 prior to the molding step.

A second embodiment of a rotor assembly 220 is shown in FIG. 10 and is similar to rotor assembly 20 described above, however, no molded insert is created. Rotor assembly 220 has pole pieces 224 and 226 with molded fans 228 and 230 being molded thereon. Fans 228 and 230 include respective fan blades 232 and 234. Slip ring assembly 36 mounts on rotor shaft 38 with mold shutoff ring 100 again serving as a shutoff providing a radial seal between a mold assembly (not shown) and rotor shaft 38 during injection molding of fans 228 and 230.

Radially inner and outer anchor recesses 241 and 243 are provided on the outboard axial face of pole pieces 224. Similarly, radially inner and outer anchor recesses 245 and 247 are formed in pole pieces 226. Preferably, the anchor recesses 241, 243, 245 and 247 are dovetailed in cross-section. Radially inner anchor recesses 241 and 245 may extend continuously circumferentially or else be circumaxially spaced. Anchor recesses 243 and 247 are circumaxially spaced on the outboard axial faces adjacent fingers 258 and 260. The mold assembly used to form fans 228 and 230 seals against the outboard axial faces of pole pieces 224 and 226. This prevents leaking of mold material between the circumaxially spaced gaps formed between fingers 258 and 260 and into the region formed between pole pieces 224 and 226 during molding. Fans 228 and 230 have respective anchors 249 and 251 and 253 and 255 which are cooperatively held within respective anchoring recesses 241, 243, 245 and 247. This anchoring prevents fans 228 and 230 from separating from pole pieces 224 and 226 and eliminates the need to have a molded insert between pole pieces 224 and 226.

Figure 13:
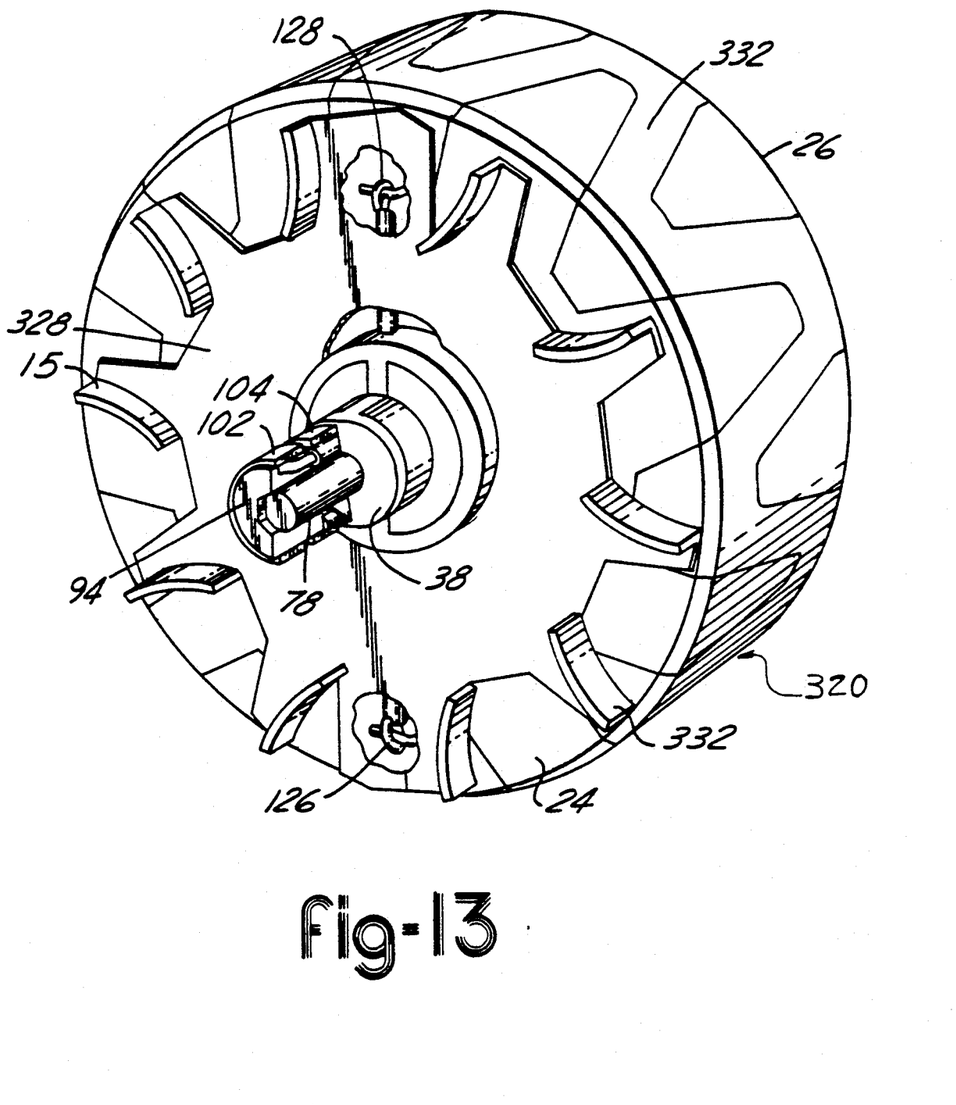
FIG. 13 is a perspective view, partially in cutaway, of the rotor assembly of FIG. 12 with stamped metal fans attached.

A third embodiment of a rotor assembly 320, also similar in construction to that of rotor assembly 20, is shown in FIG. 13. Rotor assembly 320 has a molded insert 322 formed between pole pieces 24 and 26. However, rather than using molded fans, rotor assembly 320 uses stamped metal fans 328 and 330, which are shown in FIG. 4.

Figure 11:
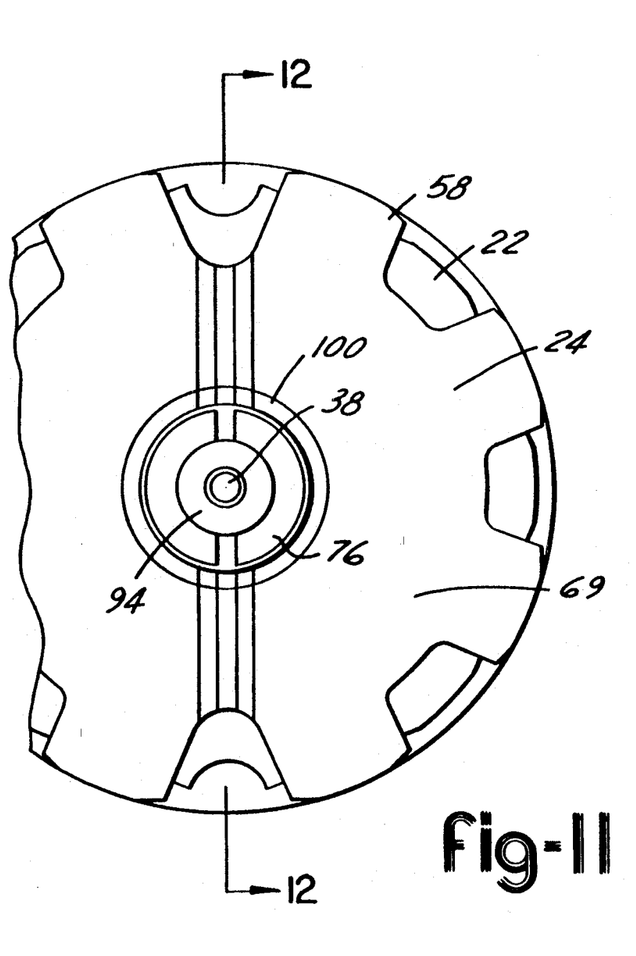
FIG. 11 is a fragmentary rear view of a molded rotor assembly without fans attached.
Figure 12:
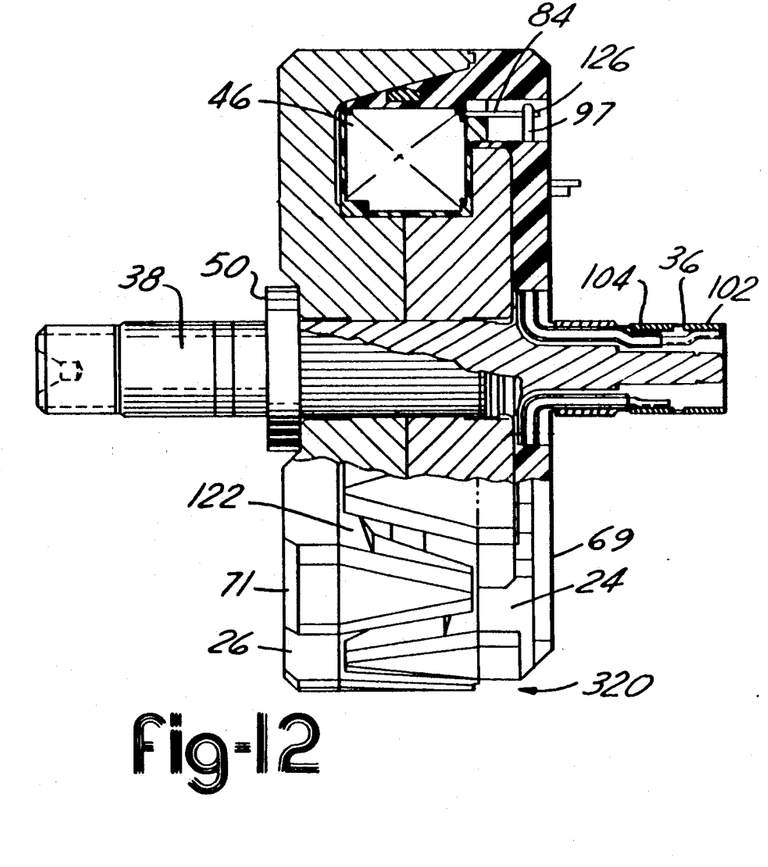
FIG. 12 is a side view taken generally along line 12—12 of FIG. 11, partially in section and partially in cutaway.

FIGS. 11 and 12 show pole pieces 24 and 26 prior to attachment of fans 328 and 330. Axially outboard faces 69 and 71 of pole pieces 24 and 26 remain free of mold material, with the exception of radially extending channels 72 which are again filled with mold material during the molding operation.

Connection 126, shown cutaway in FIG. 13, and connection 128, not shown, are again encapsulated in mold material. A lower portion of molded rotor assembly 320 in FIG. 12 is shown without mold material to illustrate the space available in region 122 between pole pieces 24 and 26. Without molded insert 322, air passing through region 122 would cause noise during the rotation of rotor assembly 320.

The mold used to form molded rotor assembly 320, not shown, mates flushly against the outboard axial faces 69 and 71 of pole pieces 24 and 26 to keep these faces free of mold material, except for the axially extending channels 72 which are filled with mold material in the molding step.

Stamped metal fans 328 and 330, having respective axially outboard extending fan blades 332 and 334, as shown in FIGS. 4 and 13, are welded to outboard axial faces 69 and 71 of pole pieces 24 and 26. As described above, the use of molded insert 22, molded fans 28 and 30 and slip ring assembly 36 in molded rotor assembly 20 has advantages over prior art rotor assemblies.

Molded insert 22 fills the region 122 eliminating any empty air space located between the pole pieces 24 and 26. The exterior cylindrical surface of the rotor assembly 20 may be made smooth. Therefore, there is significantly less air disturbance in the region between pole pieces 24 and 26 in the present design than in a rotor assembly design having no molded insert 22. Accordingly, noise produced by the rotating rotor assembly 20 is less than the noise of rotor assemblies of a conventional design.

A second advantage is that the molded insert 22 provides radial and circumferential support to the fingers 58 and 60 of the pole pieces 24 and 26, respectively. The molded insert 22 provides sufficient support such that the support ring 48 may be eliminated. However, the combination of the support ring 48 and molded insert 22 provides more support, and consequently allows less vibration by the fingers 58 and 60, than is allowed by using molded insert 22 alone. Molded insert 22 also appears to serve a noise dampening function due to its material characteristics.

A third advantage of using the molded insert 22 is that connections 126 and 128 are completely encapsulated and supported. This support reduces the loads and corresponding stresses carried by the connections 126 and 128 during alternator operation, and therefore, extends the fatigue life of connections 126 and 128. Accordingly, the operational lives of the rotor assembly 20, and its corresponding alternator 160, are extended.

Use of molded fans 28 and 30 in rotor assembly 20 obviates the need to affix fans to pole pieces 24 and 26. Additionally, configurations of blade shapes which are not possible with stamped metal fans are available with molded fans. Further, molded fans 28 and 30 can be accurately incorporated into rotor assembly 20 to provide a rotor assembly which is relatively well balanced and requires less rework to achieve a proper balance than do conventional rotor assemblies using stamped metal fans.

Mold shutoff ring 100 provides significant structural support and rigidity to terminals 96 and 98. Further, mold shutoff ring 100 provides a ready mold shutoff mechanism when captured between a mold and a pole piece to prevent molten mold material from overflowing onto a rotor shaft and associated slip rings. The mating of mold shut ring 100 between pole piece 24 and mold half 132 allows substantial compressive forces to be applied across rotor subassembly 124 without damaging mold shut ring 100 or adversely affecting its sealing function.

While this invention has been described in the foregoing specification in relation to certain preferred embodiments thereof, and many details have been set forth for the purposes of illustration, it will be apparent to those skilled in the art that the invention is susceptible to additional embodiments and that certain details described herein can be varied considerably without departing from the basic principles of the invention.

What is claimed is:

1. A molded rotor assembly for a vehicle alternator, the rotor assembly comprising:
   an elongated rotor shaft having a longitudinal axis;
   first and second pole pieces axially aligned along and spacedly mounted on the rotor shaft to define a region between the pole pieces, each pole piece having an outboard axial face;
   a coil wire having a plurality of turns cooperatively held in the region between the pole pieces, the coil wire having a pair of free ends;
   a pair of slip rings mounted to the rotor shaft and connected to a pair of terminals, each terminal attaching to a respective free end of the coil wire to form a pair of respective connections; and
   a molded component including a molded fan integrally molded to at least one of the outboard axial faces, the molded fan having a plurality of circumaxially spaced blades;
   the molded component further including a molded insert integrally molded to at least one of the pole pieces in the region between the pole pieces and integrally molded with the fan to anchor the fan to the pole piece;
   wherein the molded component encapsulates at least one of the connections thereby providing structural support to the connection to prevent failure of the connection during high speed rotation of the rotor assembly and to protect the connection from corrosion.

2. The rotor assembly of claim 1 wherein:
   the outboard axial face, to which the molded fan is attached, has at least one anchor formed thereon and the fan has at least one anchoring portion molded to the anchor whereby the fan is secured to the outboard axial face.

3. The rotor assembly of claim 2 wherein:
   the anchor is an anchoring recess formed in the outboard axial face.

4. The rotor assembly of claim 3 wherein:
   the anchoring recess is dovetailed in cross-section.

5. The rotor assembly of claim 1 wherein:
   the fan is made of a glass-reinforced polyphenylene sulfide.

6. The rotor assembly of claim 1 wherein:
   the molded component further includes a molded insert integrally molded to at least one of the pole pieces in the region between the pole pieces and integrally molded with the fan to anchor the fan to the pole piece;

the molded insert encapsulating the coil wire to prevent movement of one turn of the coil wire relative to another turn thereby preventing fatigue failure of the coil wire.

7. The rotor assembly of claim 6 further comprising:
a bobbin about which the coil wire is wound;
the molded insert encapsulating the bobbin and affixing the bobbin relative to the pole pieces thereby preventing movement of the coil wire relative to the pole pieces to prevent fatigue failure of the coil wire.

8. An alternator for a vehicle including:
a housing;
a stator having windings and being supported by the housing; and
a rotor assembly cooperating with and being rotatable relative to the stator and housing, the rotor assembly including an elongated rotor shaft, a pair of annular pole pieces axially aligned along and mounted on the rotor shaft to define a region between the pole pieces, each pole piece having an outboard face, a coil wire having a plurality of turns held within the region and having a pair of free ends, a pair of slip rings which are mounted on the rotor shaft and which are connected to a pair of terminals which are attached to the respective free ends of the coil wire to form a pair of respective connections, a molded component including a molded fan integrally molded to one of the outboard faces of the pole pieces and a molded insert which at least partially fills the region between the pole pieces and which is integrally molded with the fan to secure the fan to the pole piece, the molded insert encapsulating the coil wire preventing movement between turns of the coil wire to thereby prevent fatigue failure of the coil wire.

9. The alternator of claim 8 wherein:
the molded insert encapsulates at least one of the connections formed between the terminals of the slip ring assembly and the free ends of the coil wire.

10. A method for making a molded rotor assembly for a vehicle alternator, the method comprising the steps of:
mounting a pair of pole pieces on an elongated rotor shaft with a coil wire, having a plurality of turns and a pair of free ends, being held in a region formed between the pole pieces, each pole piece having an outboard axial face;
mounting a pair of slip rings, connected to a pair of terminals, to the rotor shaft;
connecting free ends of the terminals to the free ends of the coil wire to form a pair of connections; and
molding a molded component including at least one fan to one of the outboard axial faces of one of the pole pieces, the fan having a plurality of circumaxially spaced blades, the molded component also encapsulating at least one of the connections thereby providing structural support to the connection.

11. The method of claim 10 wherein:
the step of molding includes integrally molding a molded insert to the fan and to at least one of the pole pieces, the molded insert at least partially filling the region between the pole pieces and anchoring the fan to one of the pole pieces and encapsulating the coil wire thereby preventing movement between turns of the coil wire.

12. The method of claim 10 wherein:
at least one of the outboard axial faces has an anchor formed therein and the step of molding includes molding anchoring portions to the anchor thereby securing the fan to the axial outboard face.

13. The method of claim 12 wherein:
the anchor is an anchoring recess.

14. The method of claim 13 wherein:
the step of molding includes encapsulating at least one terminal within the molded fan.

15. A molded rotor assembly for a vehicle alternator, the rotor assembly comprising:
an elongated rotor shaft having a longitudinal axis;
first and second pole pieces axially aligned along and spacedly mounted on the rotor shaft to define a region between the pole pieces, each pole piece having an outboard axial face;
a coil wire cooperatively held in the region between the pole pieces, the coil wire having a pair of free ends;
a pair of slip rings mounted to the rotor shaft and connected to a pair of terminals, each terminal attaching to a respective free end of the coil wire to form a pair of respective connections; and
a molded fan integrally molded to at least one of the outboard axial faces, the molded fan having a plurality of circumaxially spaced blades;
one of the outboard axial faces having a support channel formed therein with one of the terminals being received in the channel with the molded fan encapsulating that terminal within the channel thereby providing structural support to the terminal.

16. The molded rotor of claim 15 wherein:
one of the outboard axial faces has a pair of radially extending support channels formed therein with the molded fan encapsulating the terminals within the respective channels thereby providing structural support to the terminal.

17. A method for making a molded rotor assembly for a vehicle alternator, the method comprising the steps of:
mounting a pair of pole pieces on an elongated rotor shaft with a coil wire, having a plurality of turns and a pair of free ends, being held in a region formed between the pole pieces, each pole piece having an outboard axial face, one of the axial faces having a support channel formed therein;
mounting a pair of slip rings, connected to a pair of terminals, to the rotor shaft;
connecting free ends of the terminals to the free ends of the coil wire to form a pair of connections;
placing a terminal within the support channel; and
molding a molded component including at least one fan to one of the outboard axial faces of one of the pole pieces encapsulating the terminal within the channel during the molding, the fan having a plurality of circumaxially spaced blades.

* * * * *